United States Patent
Jordan

(10) Patent No.: US 11,745,790 B2
(45) Date of Patent: Sep. 5, 2023

(54) GEAR ASSEMBLY AND STEERING SYSTEM

(71) Applicant: ZF Automotive Germany GmbH, Alfdorf (DE)

(72) Inventor: Martin Jordan, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/900,425

(22) Filed: Aug. 31, 2022

(65) Prior Publication Data

US 2023/0078126 A1 Mar. 16, 2023

(30) Foreign Application Priority Data

Sep. 13, 2021 (DE) .......................... 102021210099.6

(51) Int. Cl.
| | |
|---|---|
| *B62D 5/04* | (2006.01) |
| *F16H 55/24* | (2006.01) |
| *F16H 57/12* | (2006.01) |
| *F16H 19/08* | (2006.01) |

(52) U.S. Cl.
CPC ........... *B62D 5/0403* (2013.01); *F16H 19/08* (2013.01); *F16H 55/24* (2013.01); *F16H 57/12* (2013.01)

(58) Field of Classification Search
CPC .......... F16H 57/12; F16H 19/08; F16H 55/18; F16H 55/24; B62D 5/0403
USPC ....................................................... 74/89.14
See application file for complete search history.

(56) References Cited

U.S. PATENT DOCUMENTS

| | | | | |
|---|---|---|---|---|
| 6,491,131 B1* | 12/2002 | Appleyard | ................ | F16D 3/68 180/444 |
| 2002/0195893 A1* | 12/2002 | Kobayashi | ............. | H02K 7/081 310/83 |
| 2011/0240399 A1* | 10/2011 | Suzuki | ...................... | F16D 3/68 180/444 |
| 2013/0075189 A1* | 3/2013 | Sekikawa | ............... | F16C 23/08 180/444 |
| 2014/0182401 A1* | 7/2014 | Ishii | ..................... | B62D 5/0409 74/89.14 |
| 2015/0266506 A1* | 9/2015 | Sato | ..................... | B62D 5/0409 180/444 |
| 2017/0175821 A1* | 6/2017 | Segawa | ..................... | F16D 3/74 |
| 2017/0297610 A1* | 10/2017 | Ishii | ......................... | F16H 1/16 |
| 2020/0102002 A1* | 4/2020 | Kirschstein | ........... | F16H 57/021 |

(Continued)

FOREIGN PATENT DOCUMENTS

EP 2559607 A1 2/2013

*Primary Examiner* — Charles A Fox
*Assistant Examiner* — T. Scott Fix
(74) *Attorney, Agent, or Firm* — Kristin L. Murphy

(57) ABSTRACT

The disclosure specifies a gear assembly for an electric-motor assisted steering system, comprising an electric motor, a worm shaft which can be driven by the electric motor and which meshes with a worm wheel. The worm shaft has a recess on an end face which faces the electric motor, in which recess there is arranged an elastic element which applies an axial force to the worm shaft in the direction away from the electric motor. In the axial direction, the elastic element is supported by one end on an adjustment element, which is formed in such a way that it permits expansion of the elastic element in the axial direction when the axial force on the worm shaft exceeds a defined threshold value, and limits expansion of the elastic element when the axial force on the worm shaft lies below the defined threshold value.

13 Claims, 2 Drawing Sheets

(56) References Cited

U.S. PATENT DOCUMENTS

2020/0156697 A1* 5/2020 Jordan ................... F16H 55/24
2022/0243798 A1* 8/2022 Masuda ................ F16H 57/021

* cited by examiner

GEAR ASSEMBLY AND STEERING SYSTEM

CROSS-REFERENCE TO RELATED APPLICATION

This application claims priority to German Patent Application No. 102021210099.6, filed Sep. 13, 2021, the disclosure of which is incorporated herein by reference in its entirety.

TECHNICAL FIELD

The disclosure relates to a gear assembly for an electric-motor assisted steering system and a steering system.

BACKGROUND

Steering systems in motor vehicles are usually electric-motor assisted in order to reduce a steering force which has to be applied by a driver. For this purpose, for example, a worm gear having a worm shaft and a worm wheel is provided, wherein the worm shaft is driven by an electric motor and the worm wheel is coupled to a steering column.

In order to ensure a reliable function, the worm shaft must remain in stable toothed engagement with the worm wheel. However, this is made more difficult by the high tolerances on the components used. Even the dimensions of the worm shaft and of the worm wheel, which are generally made of plastic, are subject to high tolerances which, over the course of time, increase on account of wear. Because of the high tolerances, a certain amount of play is required in the mounting of the worm shaft.

For example, a preloading device is provided, which applies a preloading force to the worm shaft in the axial direction in order to keep the worm shaft within a specific tolerance range in the axial direction and, in addition, to permit reliable engagement between the worm shaft and worm wheel.

This preloading force must lie within a predefined tolerance range in every steering system that is produced. Because of the high number of influencing parameters and involved components, appropriate adjustment of the preloading force is very expensive and complicated.

SUMMARY

Consequently, what is needed is reliable and simple tolerance compensation for an electric-motor steering system.

According to the disclosure, a gear assembly for an electric-motor assisted steering system is disclosed, comprising an electric motor, a worm shaft which can be driven by the electric motor and which is in engagement with a worm wheel, wherein the worm shaft has a recess on an end face which faces the electric motor, in which recess there is arranged an elastic element which applies an axial force to the worm shaft in the direction away from the electric motor. In the axial direction, the elastic element is supported by one end on an adjustment element, which is formed in such a way that it permits expansion of the elastic element in the axial direction when the axial force on the worm shaft exceeds a defined threshold value, and limits expansion of the elastic element when the axial force on the worm shaft lies below the defined threshold value.

The gear assembly according to the disclosure has the advantage that the axial force is adjusted automatically to a suitable value, and that the axial force is additionally limited to a threshold value. A certain axial force is necessary to compensate for the tolerances. As a result, firstly, reliable engagement between the worm shaft and worm wheel is ensured. If a preloading force is too low, chattering noises can be produced, in particular if the rolling elements of a fixed bearing which is used to mount the worm shaft lose contact with the bearing rings. At the same time, however, the axial force should not be too high, since the gearbox otherwise becomes stiff. Thus the gear assembly according to the disclosure, allows for complicated adjustment of the axial force to be dispensed with.

Since the adjustment element permits expansion of the elastic element in the axial direction when the threshold value is exceeded, the elastic element is able to relax, as a result of which the axial force exerted by the elastic element decreases.

The elastic element can in particular relax until a force equilibrium between the axial force caused by the elastic element and the opposing force caused by the adjustment element is established.

The adjustment element limits expansion of the elastic element when the worm shaft is installed in the vehicle environment, after tolerance compensation by the elastic element has taken place. Expansion of the elastic element within the scope of the tolerance compensation is thus not impeded by the adjustment element but is desired. This means that the elastic element can also expand within the scope of the tolerance compensation when the axial force lies below the threshold value.

In one exemplary arrangement, the recess, the elastic element and the adjustment element are designed in such a way that the axial force effected by the elastic element reaches a minimum value during the mounting of the gear assembly. If the axial force is too low, chattering noises could not be avoided reliably.

According to one arrangement, the recess, the elastic element and the adjustment element are designed in such a way that the defined threshold value is exceeded a little during the mounting, and thus displacement of the adjustment element takes place. As a result, a preloading force can be set as accurately as possible and, at the same time, too low a preloading force is avoided.

The worm shaft and the worm wheel together form a worm gear.

The elastic element is, for example, a coil spring.

For example, the adjustment element permits expansion of the elastic element when the axial force effected by the elastic element exceeds 250 N, in particular 280 N. This is reached by the adjustment element being supported in such a way that a correspondingly high force is necessary to displace the adjustment element. In this way, a sufficiently high axial force is ensured in order to ensure reliable engagement of all the involved components and, at the same time, excessively high friction and axial bearing loading are avoided. Depending on the application, expansion of the elastic element can also even take place at an applied axial force of less than 250 N.

According to one exemplary arrangement, the adjustment element is pressed into the recess, wherein the press fit is designed in such a way that the adjustment element is displaceable in the recess if the threshold value is exceeded. If the axial force lies below the threshold value, the adjustment element is consequently firmly seated, which means that the force acting on the adjustment element is not sufficient to displace the adjustment element in the recess. By a press fit, the required displaceability of the adjustment element can be implemented in a simple way.

For example, the adjustment element is arranged between the elastic element and a bottom of the recess. As a result, a displacement travel of the adjustment element is limited, as a result of which, in turn, a maximum reduction in the axial force can be limited.

According to a further exemplary arrangement, a bush is inserted into the recess, wherein the adjustment element is pressed onto the bush in such a way that the adjustment element is displaceable relative to the bush when the threshold value is exceeded. This exemplary arrangement has an advantage that the press fit can be made outside the worm shaft. In addition, the diameter tolerance of the recess is not relevant in this case, since in this case the recess is used only for guidance and is not involved in the press fit. Furthermore, a loading test can be carried out before the adjustment element is inserted into the recess in the worm shaft.

In one exemplary arrangement, the bush is displaceably supported in the recess.

The adjustment element and/or the bush can be a deep-drawn part. The adjustment element and/or the bush can be produced simply in this way.

The bush can be slit. In particular, slits extend in the axial direction in the bush. As a result, the bush is slightly flexible in the radial direction, which means that the bush can be displaced more easily in the recess. The slits thus ensure tolerance compensation between the recess and the bush.

The bush is accommodated without play in the recess. As a result, stable guidance of the bush is ensured. The play-free mounting additionally also serves to reduce noise. In practical terms, the bush is prevented from chattering in the recess.

The worm shaft can be rotatably mounted by a fixed bearing, and a drive shaft of the electric motor can be coupled to the worm shaft in a torque-transmitting manner via a coupling device, wherein the coupling device is supported on the fixed bearing and is loaded axially against the fixed bearing by the axial force effected by the elastic element. As a result of the axial loading of the fixed bearing, chattering of the fixed bearing is avoided. More precisely, the axial loading avoids the rolling elements of the bearing losing contact with the bearing rings. At the same time, a certain amount of play can be implemented in the bearing, which permits possible oscillation of the worm shaft, as a result of which the worm shaft is loaded less highly. As a result of the limitation of the axial force to a threshold value, the frictional forces in the bearing are prevented from becoming too high and, as a result, the bearing becoming stiff.

Alternatively, there can be a collar on the worm shaft, which is supported on the fixed bearing and is loaded axially against the fixed bearing by the axial force effected by the elastic element.

According to the disclosure, a steering system for a motor vehicle having a gear assembly according to the disclosure is also provided.

BRIEF DESCRIPTION OF DRAWINGS

Further advantages and features can be gathered from the following description and from the appended drawings, to which reference is made. In the drawings.

DETAILED DESCRIPTION

Figure 1:
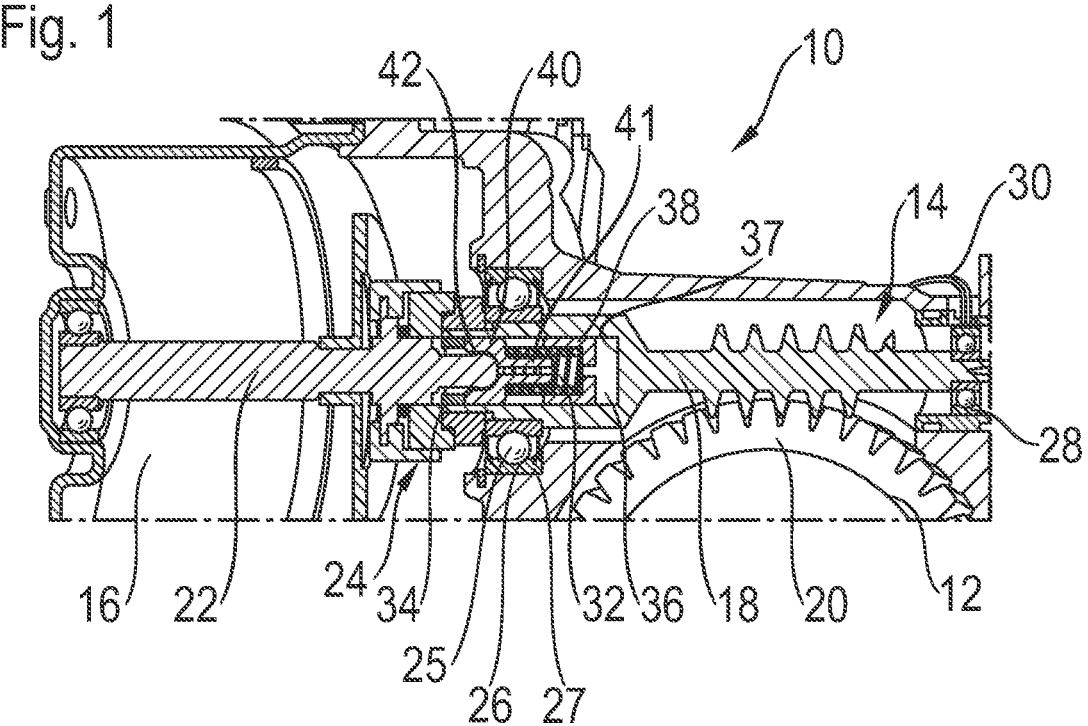
FIG. 1 shows part of a steering system according to the disclosure having a gear assembly according to the disclosure.

FIG. 1 shows part of an electric-motor assisted steering system 10. The steering system 10 comprises a steering column 12, which can be rotated by a user by a steering wheel, not illustrated, in order to maneuver a vehicle.

To simplify a steering operation, a gear assembly 14 is provided for the electric-motor assistance of the steering system 10.

The gear assembly 14 comprises an electric motor 16, a worm shaft 18, which can be driven by the electric motor 16, and a worm wheel 20, with which the worm shaft 18 is in engagement, more specifically in toothed engagement.

To drive the worm shaft 18, a drive shaft 22 of the electric motor 16 is coupled to the worm shaft 18 in a torque-transmitting manner via a coupling device 24.

The worm wheel 20 is firmly coupled to the steering column 12.

Consequently, the steering column 12 is rotated by the worm wheel 20 when the worm shaft 18 is driven by the electric motor 16.

The worm shaft 18 is rotatably mounted by a fixed bearing 26. The fixed bearing 26 is a rolling-contact bearing having rolling elements 25 and bearing rings 27.

The coupling device 24 is supported in the axial direction on the fixed bearing 26. In addition, the coupling device 24 is positioned radially inside and axially in the region of the fixed bearing.

In addition, to support the worm shaft 18, there is a loose bearing 28, wherein the fixed bearing 26 and the loose bearing 28 are arranged in opposite end sections of the worm shaft 18.

The loose bearing 28 is loaded laterally by a spring 30, in order to keep the loose bearing 28 in the position shown in FIG. 1.

Due to the spring 30, reliable engagement between the worm shaft 18 and the worm wheel 20 is ensured.

Furthermore, there is an elastic element 32, a coil spring in the exemplary arrangement, which applies an axial force to the worm shaft 18 in a direction away from the electric motor 16.

As a result of the axial loading, the rolling elements 25 of the fixed bearing 26 are in contact with bearing rings 27 of the fixed bearing 26.

In addition, the elastic element 32 is used to compensate for tolerances.

On an end face 34 facing the electric motor 16, the worm shaft 18 has a recess 36, in which the elastic element 32 is arranged.

The elastic element 32 is supported in the axial direction with one end on an adjustment element 38.

In the exemplary arrangement illustrated in FIG. 1, the adjustment element 38 is a bush, which is pressed into the recess 36.

The adjustment element 38 is arranged between the elastic element 32 and a bottom 37 of the recess 36.

The adjustment element 38 can be a milled part or a deep-drawn part.

The elastic element 32 is supported by the other end on a further bush 40, which is accommodated without play in the recess and is displaceably mounted.

The bush 40 is a milled part in the exemplary arrangement according to FIG. 1.

Formed on the bush 40 is an extension 41, onto which the elastic element 32 is pushed. As a result, assembly of the gear assembly 14 is simplified. In addition, the extension 41 prevents buckling of the elastic element 32.

In addition, the elastic element 32 is accommodated a little way in the adjustment element 38.

Because the elastic element 32 is accommodated in the adjustment element 38 and is additionally pushed onto the extension 41, the elastic element 32 is supported stably over its entire length.

Both the bush 40 and the adjustment element 38 have a circular cross section in the exemplary arrangement. However, other cross sections are also conceivable, for example an oval cross section or an angular cross section.

At an end opposite to the elastic element 32, the bush 40 has a recess 42, in which an end section of the drive shaft 22 is accommodated.

The elastic element 32 thus firstly forces the bush 40 against the drive shaft 22 of the electric motor 16 and secondly forces the worm shaft 18 away from the drive shaft 22. In this way, an axial tolerance chain is compensated.

In addition, the coupling device 24 is loaded axially against the fixed bearing 26 by the axial force effected by the elastic element 32.

According to the disclosure, the adjustment element 38 is formed in such a way that it permits expansion of the elastic element 32 in the axial direction when the axial force on the worm shaft 18 exceeds a defined threshold value, and limits expansion of the elastic element 32 when the axial force on the worm shaft 18 lies below the defined threshold value.

For example, an axial force effected by the elastic element 32 should not exceed 280 N, preferably 250 N. In the event of higher axial forces, high friction in the gear assembly 14 would occur, as a result of which the latter becomes stiff.

For this purpose, the press fit of the adjustment element 38 in the recess 36 is designed in such a way that the adjustment element 38 is displaced in the recess 36 when the axial force exceeds the threshold value.

This means that if the elastic element 32 is compressed so highly because of an unfavorable tolerance situation that the axial force on the worm shaft 18 exceeds the threshold value, the adjustment element 38 is displaced in the recess 36.

As a result of a displacement of the adjustment element 38, in particular in the direction of the bottom 37 of the recess 36, the elastic element 32 can relax, which reduces the axial force.

If the axial force is reduced to such an extent that the threshold value is no longer exceeded, the adjustment element 38 is not displaced further.

The press fit is influenced by a diameter of the adjustment element 38 and of the recess 36, the diameters being matched to each other.

In addition, ribs can be molded on the adjustment element 38 or in the recess 36 and/or the adjustment element 38 can be slit in order to optimize the press fit.

Figure 2:
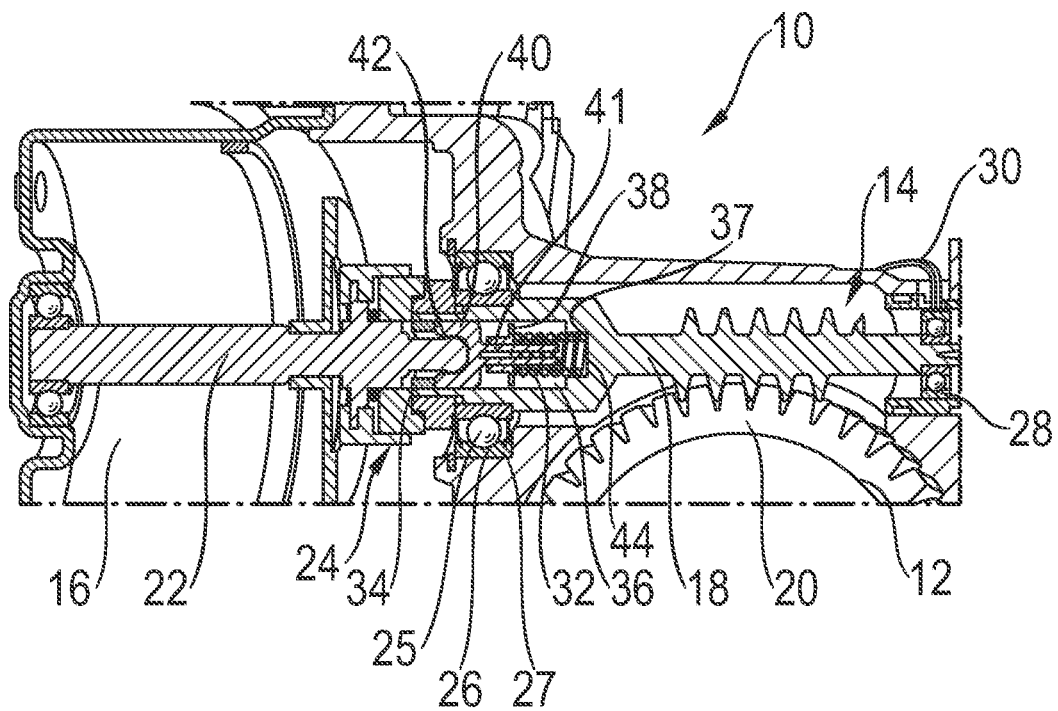
FIG. 2 shows a further steering system according to the disclosure having a further gear assembly according to the disclosure.

FIG. 2 shows a further exemplary arrangement of an electric-motor assisted steering system 10. The steering system 10 according to FIG. 2 differs from the steering system 10 according to FIG. 1 in the arrangement of the elastic element 32 and of the adjustment element 38.

In particular, the adjustment element 38 according to the exemplary arrangement illustrated in FIG. 2 is pressed onto the bush 40 in such a way that the adjustment element 38 is displaceable relative to the bush 40 when the threshold value is exceeded.

More specifically, the adjustment element 38 is pressed onto the extension 41 of the bush 40.

In this case, the elastic element 32 is arranged between the bottom 37 of the recess 36 and the adjustment element 38.

The adjustment element 38 is, for example, a deep-drawn part.

The functional principle of the gear assembly 14 does not change, however.

This means that if the elastic element 32 is compressed so highly because of an unfavorable tolerance situation that the axial force on the worm shaft 18 exceeds a threshold value, the adjustment element 38 is displaced on the bush 40, in particular on the extension 41, so that the elastic element 32 can relax, specifically to such an extent that the axial force no longer exceeds the threshold value.

In the bottom 37 of the recess 36 in the exemplary arrangement according to FIG. 2, there is an additional recess 44, in which the elastic element 32 is accommodated a little way in. As a result, the elastic element 32 is particularly stably supported.

Figure 3:
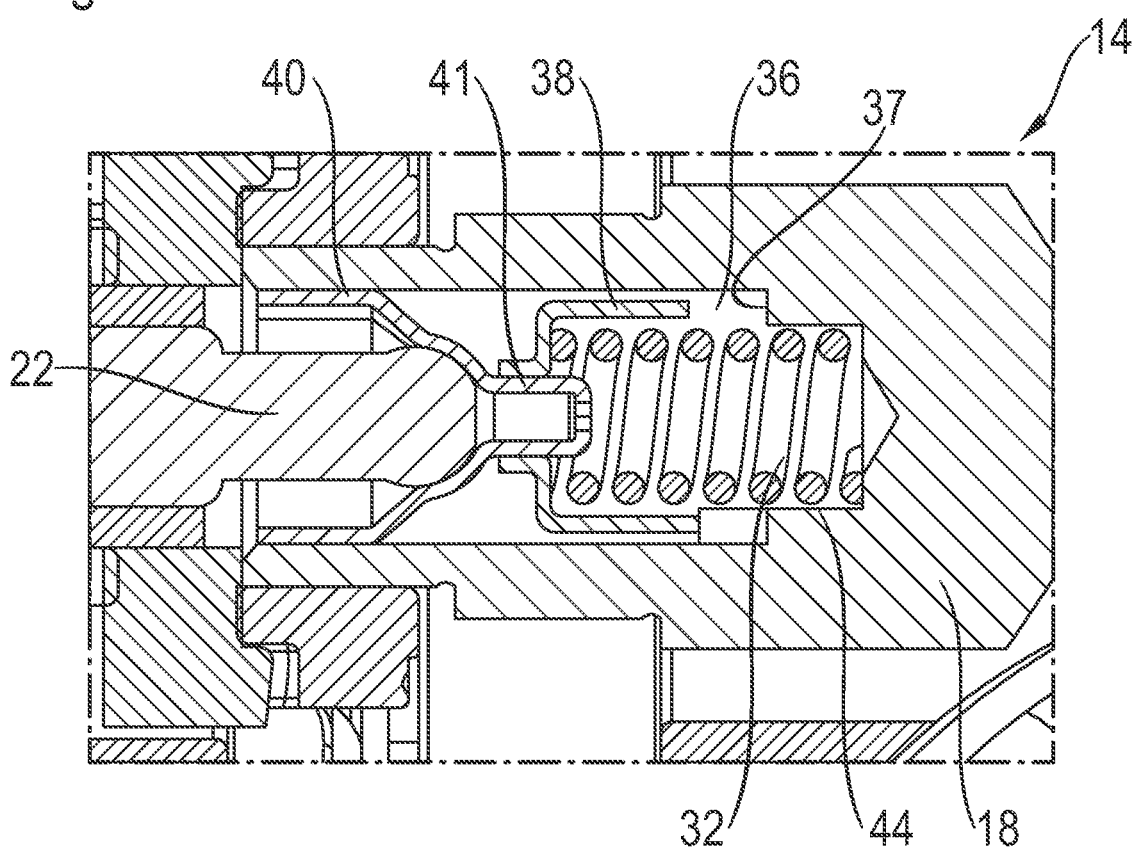
FIG. 3 shows part of a gear assembly according to the disclosure according to yet another exemplary arrangement.

FIG. 3 shows a section through a gear assembly 14 for a steering system 10 according to a further exemplary arrangement.

The exemplary arrangement illustrated in FIG. 3 corresponds substantially to the exemplary arrangement illustrated in FIG. 2, with the difference that both the bush 40 and the adjustment element 38 are formed as deep-drawn parts.

In addition, the adjustment element 38 illustrated in FIG. 3 is pot-shaped, and the elastic element 32 is partly accommodated in the adjustment element 38. This is used for improved guidance of the elastic element 32.

The invention claimed is:

1. A gear assembly for an electric-motor assisted steering system, comprising an electric motor, a worm shaft configured to be driven by the electric motor and that meshes with a worm wheel, wherein the worm shaft defines a recess on an end face that faces the electric motor, wherein an elastic element is disposed within the recess and is configured to apply an axial force to the worm shaft in a direction away from the electric motor, wherein, in the axial direction, the elastic element is supported by one end within an adjustment element, wherein the adjustment element permits expansion of the elastic element in an axial direction via displacement of the adjustment element within the recess when the axial force on the worm shaft exceeds a defined threshold value, and limits expansion of the elastic element when the axial force on the worm shaft lies below the defined threshold value.

2. The gear assembly as claimed in claim 1, wherein the adjustment element-permits expansion of the elastic element when the axial force effected by the elastic element exceeds 250 N.

3. The gear assembly as claimed in claim 1, wherein the adjustment element is arranged between the elastic element and a bottom of the recess.

4. The gear assembly as claimed in claim 1, wherein a bush is inserted into the recess, wherein the adjustment element is pressed onto the bush in such a way that the adjustment element is displaceable relative to the bush when the threshold value is exceeded.

5. The gear assembly as claimed in claim 4, wherein the adjustment element and/or the bush is a deep-drawn part.

6. The gear assembly as claimed in claim 4, wherein the bush includes a slit.

7. The gear assembly as claimed in claim 4, wherein the bush is accommodated without play in the recess.

8. The gear assembly as claimed in claim 1, wherein the worm shaft is rotatably mounted by a fixed bearing, and a drive shaft of the electric motor is coupled to the worm shaft in a torque-transmitting manner via a coupling device, wherein the coupling device is supported on the fixed bearing and is loaded axially against the fixed bearing by the axial force effected by the elastic element.

9. A steering system for a motor vehicle having a gear assembly as claimed in claim 1.

10. The gear assembly as claimed in claim 1, wherein into a bush is disposed within the recess, wherein the adjustment element is pressed onto the bush in such a way that the adjustment element is displaceable relative to the bush when the threshold value is exceeded.

11. The gear assembly as claimed in claim 5, wherein the bush includes a slit.

12. The gear assembly as claimed in claim 6, wherein the bush is accommodated without play in the recess.

13. The gear assembly as claimed in claim 4, wherein the worm shaft is rotatably mounted by a fixed bearing, and a drive shaft of the electric motor is coupled to the worm shaft in a torque-transmitting manner via a coupling device, wherein the coupling device is supported on the fixed bearing and is loaded axially against the fixed bearing by the axial force effected by the elastic element.

* * * * *